(12) United States Patent
Lee et al.

(10) Patent No.: US 6,697,551 B2
(45) Date of Patent: Feb. 24, 2004

(54) MODE TRANSFORMER BETWEEN LOW INDEX DIFFERENCE WAVEGUIDE AND HIGH INDEX DIFFERENCE WAVEGUIDE

(75) Inventors: Kevin K. Lee, Cambridge, MA (US); Kazumi Wada, Lexington, MA (US); Desmond Lim, Cambridge, MA (US); Lionel C. Kimerling, Concord, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 124 days.

(21) Appl. No.: 09/978,310

(22) Filed: Jun. 26, 2001

(65) Prior Publication Data

US 2002/0118916 A1 Aug. 29, 2002

Related U.S. Application Data

(63) Continuation-in-part of application No. 09/841,464, filed on Apr. 24, 2001.
(60) Provisional application No. 60/217,168, filed on Jul. 10, 2000.

(51) Int. Cl.$^7$ .................................................. G02B 6/26
(52) U.S. Cl. .......................... 385/28; 385/43; 385/132
(58) Field of Search .............................. 385/14, 27, 28, 385/43, 98, 124, 126, 132

(56) References Cited

U.S. PATENT DOCUMENTS

| | | | |
|---|---|---|---|
| 5,056,888 A | * 10/1991 | Messerly et al. | 385/123 |
| 5,185,828 A | * 2/1993 | van der Tol | 385/28 |
| 5,199,092 A | 3/1993 | Stegmueller | 385/50 |
| 5,208,800 A | * 5/1993 | Isobe et al. | 369/112.27 |
| 6,396,984 B1 | * 5/2002 | Cho et al. | 385/43 |

OTHER PUBLICATIONS

"Simple and Low–Loss Fibre–To–Chip Coupling By Integrated Field–Matching Waveguide In InP", Schwander et al., Electronics Letters, Feb. 18, 1993, vol. 29, No. 4, pp.: 326–328.*

"Laterally Tapered InP–InGaAsP Waveguides For Low–Loss Chip–To–Fiber Butt Coupling: A Comparison Of Different Configurations", Zengerle et al., IEEE Photonics Technology Letters, vol. 7, No. 5, May 1995, pp.: 532–534.*

"Unbalanced Facet Output Power And Large Sopt Size In 1.3 um Tapered Active Stripe Lasers", Cho et al., Apr. 24, 1997, vol. 33, No. 9.*

"Unbalanced facet output power and large spot size in 1.3μm tapered active stripe lasers," Cho et al. *Electronics Letters.* Apr. 1997, vol. 33, No. 9.

"Optical Fiber–Polymer Guide Coupling by a Tapered Graded Index Glass Guide," Sottini et al. *IEEE Journal of Quantum Electronics.* Jun. 1995. No. 6.

"A Review on Fabrication Technologies For The Monolithic Integration of Tapers with III–V Semiconductor Devices" by Moerman et al., IEEE Journal of Selected Topics In Quantum Electronics, vol. 3, No. 6, Dec. 1997, pp.: 1308–1320.

(List continued on next page.)

*Primary Examiner*—David V. Bruce
*Assistant Examiner*—Therese Barber
(74) *Attorney, Agent, or Firm*—Samuels, Gauthier & Stevens, LLP

(57) ABSTRACT

A mode transformer that enables low-loss coupling between optical modes of two waveguides with different index difference. The mode size and the effective index are gradually changed between two waveguides to gradually transform the mode shape, size, and speed with minimum power loss. The mode transformer is useful for coupling the mode of an optical fiber waveguide with low index difference to the mode of a planar high index difference waveguide, and vice versa.

44 Claims, 3 Drawing Sheets

OTHER PUBLICATIONS

"Laterally Tapered InP–InGaAsP Waveguides for Low–Loss Chip–to–Fiber Butt Coupling: A Comparison of Different Configuration", by Zengerle et al., IEEE Photonics Technology Letters, vol. 7, No. 5, May 1995, pp.: 532–534.

"Simple and Low–Loss Fibre–To–Chip Coupling By Integrated Field–Matching Waveguide In InP", by Schwander et al., Electronics Letters Feb. 18, 1993, vol. 29, No. 4, pp.: 326–328.

"Integrated Optical Modeshape Adapters in InGaAsP/InP For Efficient Fiber–to–Waveguide Coupling", Brenner et al., IEEE Photonics Technology Letters, vol. 5, No. 9, Sep. 1993, pp.: 1053–1056.

* cited by examiner

MODE TRANSFORMER BETWEEN LOW INDEX DIFFERENCE WAVEGUIDE AND HIGH INDEX DIFFERENCE WAVEGUIDE

PRIORITY INFORMATION

This application claims priority from provisional application Ser. No. 60/217,168 filed Jul. 10, 2000, and is a continuation-in-part of Ser. No. 09/841,464 filed Apr. 24, 2001.

BACKGROUND OF THE INVENTION

1. Field of the Invention

The present invention is in the field of optics, specifically in optical transformers or transformers for bi-directionally coupling optical radiation between two waveguides. It is also in the field of mode transformers between two waveguides.

2. Prior Art

A mode transformer between two different waveguides is an essential part of an optical system where the lightwave (mode) from one optical component is coupled into another component. In optical communication, a mode transformer between an optical fiber waveguide and a high index difference (difference in the refractive indices of core and cladding) planar waveguide is crucial for successful implementation of planar lightwave circuits (PLC) in fiber communication. Therefore, developing an efficient mode transformer between two waveguides has been a subject of intense research.

When transforming the modes between two waveguides with different index (refractive index) differences and/or core indices, high coupling loss arises due to the difference in the mode size, shape, and mode velocity. For example, the index difference and the mode of a fiber optic waveguide are different from those of a high index difference planar waveguide, resulting in a high coupling loss when the fiber optic waveguide and the high index difference planar waveguide are coupled directly. The index difference of a fiber, which is ~0.01, is smaller than that of high index difference waveguides, which is typically equal to or larger than 0.3 in a square channel waveguide configuration, making the fiber mode larger than the high index difference waveguide mode. A channel waveguide is a dielectric waveguide whose core is surrounded by a cladding that is composed of a material or materials with refractive indices lower than that of the core, and wherein the peak optical intensity resides in the core. High index difference waveguides can be defined in other waveguide geometries including a rib waveguide. A rib waveguide is a dielectric waveguide whose core is surrounded by a cladding that is composed of materials of which at least one has the same refractive index as that of the core. In waveguide configurations that are difference from a channel waveguide, a high index difference waveguide is defined as one that has a mode-field size similar to that of a high index difference channel waveguide (within 50% difference in cross-sectional area). In these waveguides, cladding is defined as a region where the evanescent field of optical modes exists.

In addition, the core index of the fiber optic waveguide is lower than that of the high index difference planar waveguide causing a mode velocity difference between two waveguides. When such a change in mode properties takes place too quickly, high power loss arises.

There have been several approaches to achieve efficient mode coupling between two waveguides with different index difference, including mode transformation by tapering the dimension of high index difference waveguide. Mode transformation by a taper has been shown in various publications. Over the tapering region of the high index difference waveguide, the thickness or the width of the waveguide core is gradually tapered down from that of the normal guiding region to a lower thickness or width. As the mode travels from the normal guiding region of the high index difference waveguide into the tapering region, the mode experiences decreasing amount of the core material. The fraction of the mode field distribution that exists outside the core material increases, changing the mode size. The index of the waveguide that the mode experiences is effectively changed by the presence of the taper. In other words, the "effective index" is gradually changed by the taper. By gradually changing the effective index from that of the low index difference waveguide to that of the high index difference waveguide, the mode coupling can be achieved between two waveguides without high loss. The method to determine the effective index is described in "*The Handbook of Photonics*", Boca Raton, Fla. CRC Press, 532–535 (1996) by M. Gupta.

Mode transformation based on tapering is shown in the prior art including IEEE Photonics Technology Letters, Vol. 5, No. 9, September 1993 by Brenner et al. In this publication, the core of the planar waveguide is vertically tapered down from that of the regular waveguide. The mode size propagating in the tapered region increases due to the reduction of the effective index, and thus the reduction of the effective index difference. This publication shows the gradual mode transformation occurring in one waveguide due to the presence of a taper.

U.S. Pat. No. 5,199,092, issued to Stegmueller et al. shows the coupling of modes between two different waveguides: one broad and one narrow. The two waveguides run parallel to one another and are superimposed with each other to provide a superimposing waveguide guidance. During the superimposed waveguide guidance, one of the two waveguides is tapered down in vertical dimension, while the other waveguide dimension is kept constant. The role of the tapered waveguide is to provide a gradual effective index change, and thus mode transformation, same as the cases in journal publications including that by Brenner et al. The difference is the superimposition of the narrow waveguide in the broad waveguide, providing waveguiding in the broad waveguide once the narrow waveguide is completely terminated by the vertical taper. The broad waveguide is surrounding the narrow waveguide over the whole waveguiding distance. The presence of the broad waveguide helps guiding the mode once the mode transformation is complete.

In addition to single taper devices described above, dual tapers are used in mode transformation between two different waveguides. IEEE Photonics Technology Letters, Vol. 7, No. 5, May 1995 by Zengerle et al., reports a mode transformer having two channel waveguides, each with a taper, one sitting on top of the other. Electronics Letters, Vol 29, No. 4, February 1993 by Schwander et al., reports a mode transformer having two rib waveguides, each with a taper, a portion of one embedded within the other. Both of the rib waveguides used in this art are weakly guiding and thus it is not a suitable method for mode transformation to or from a high index difference waveguide. IEEE Journal of Selected Topics in Quantum Electronics, Vol 3, No 6, December 1997 by Moerman et al. summarizes these dual taper methods for mode transformation.

None of the prior art reports an efficient mode transformer between a low index difference and a high index difference waveguide. This invention discloses, for the first time, an efficient mode transformer based on an embedded dual-taper, useful for transforming the mode to and from a high index difference waveguide.

SUMMARY OF THE INVENTION

In accordance with the invention, there is provided an optical mode transformer using an embedded dual-taper, to achieve low-loss mode coupling between two waveguides, one of them having much higher index difference than the other. The transformer can be used to couple an optical mode from an optical fiber, whose typical single-mode dimension of the core is approximately 10 $\mu$m in diameter, to the mode in a high index difference planar waveguide, whose single-mode dimension of the core is typically equal to or less than 1 $\mu$m in a channel waveguide. The index difference of a square channel waveguide corresponding to a 1 $\mu$m single-mode dimension is ~0.3.

It is an objective of the invention to provide a device for transforming the mode between two waveguides with different mode sizes and indices. It is another objective of the invention to provide a device to enable low-loss coupling between the optical fiber waveguide mode and the high index difference planar waveguide mode.

In the invention, the mode undergoes a low-loss transformation between a low index difference waveguide and a high index difference waveguide by traveling through the coupling region containing a dual-taper. The dual-taper provides a gradual change in the mode properties necessary for low-loss, bi-directional mode transformation. Both the low index difference and high index difference waveguides are tapered, in opposite directions. These two oppositely running tapers are placed so that there is an overlap of two waveguides, with the smaller waveguide embedded in the larger waveguide.

It is an objective of the invention to show that the dual-taper structure enhances mode transformation efficiency between two waveguides. It is another objective of the invention to demonstrate the two tapered waveguides should be overlapped, with the overlapping length ranging up from 0, for low-loss mode transformation.

The embedded dual-taper technology disclosed in this invention is suitable for an efficient mode transformation to and from a high index difference waveguide. This has not been possible by the technology shown in prior art, which was limited to a low index difference rib waveguide configuration.

To apply the invention for coupling the modes between an optical fiber and a high index difference waveguide, the low index difference waveguide can be chosen to have similar index difference, core index, and mode size as an optical fiber. The mode from the fiber is initially coupled to the low index difference waveguide having similar properties. Therefore the coupling is achieved with low loss due to the similarity of the modes. Once coupled, light is guided in the low index difference waveguide. Then the mode and the effective index of the low index difference waveguide are gradually changed to those of the final waveguide by the dual-taper.

DETAILED DESCRIPTION OF THE INVENTION

Figure 1:
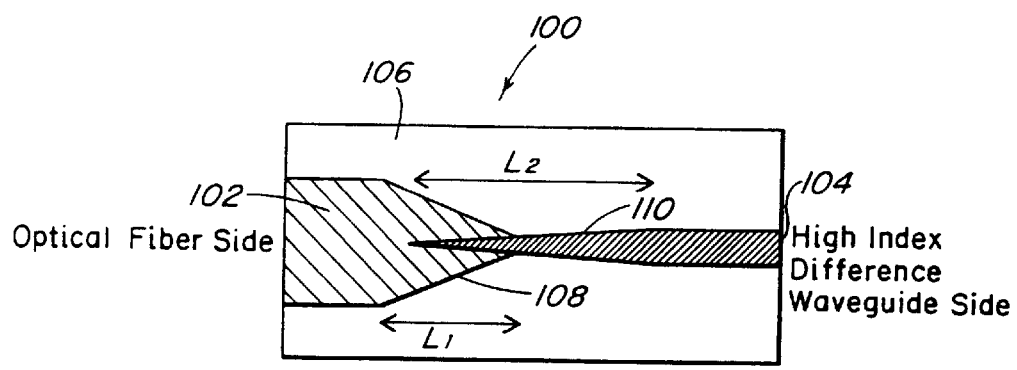
FIG. 1 is a top view of simplified schematic diagram of an exemplary embodiment of a mode transformer in accordance with the invention.
Figure 2:
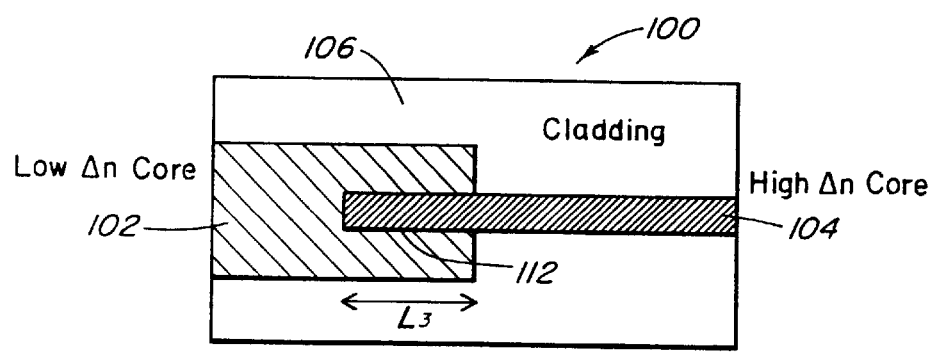
FIG. 2 is a side view of the mode transformer shown in FIG. 1.
Figure 3:
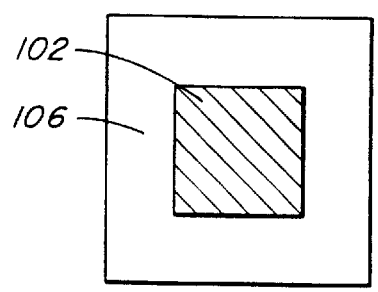
FIG. 3 is frontal view from the left side of the mode transformer shown in FIG. 1.
Figure 4:
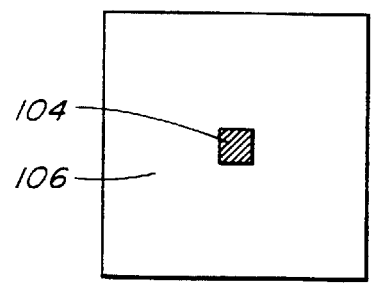
FIG. 4 is a frontal view from the right side of the mode transformer shown in FIG. 1.

FIGS. 1–4 are simplified schematic diagrams of an exemplary embodiment of a mode transformer 100 in accordance with the invention. FIG. 1 shows a top view of the mode transformer 100, while FIG. 2 shows a side view of the same transformer. FIGS. 3 and 4 show frontal views from the left and right side, respectively, of the transformer shown in FIG. 1.

The mode transformer includes a core 102 of a low index difference waveguide, a core 104 of a high index difference waveguide, and cladding 106 surrounding both cores to define the low index difference waveguide, which forms a large mode, and high index difference waveguide, which forms a small mode. Both high and low index difference waveguides are channel waveguides in this embodiment.

A tapered region 108 of length $L_1$ is provided in the low index difference waveguide. A tapered region 110 of length $L_2$ is provided in the high index difference waveguide. Each of the tapered regions 108, 110 are configured to overlap so that a portion 112, of length $L_3$, of the tapered region 110 is embedded within the tapered region 108.

The index of the core 104, $n_2$ is larger than $n_1$ and $n_3$, the indices of the core 102 and the cladding 106. In the illustrated exemplary embodiment, $n_1$ is slightly larger than $n_3$. The low index difference waveguide is defined by the core 102 and cladding 106 as seen in FIG. 3, since $n_1$ is only slightly larger than $n_3$:

$$0 < \frac{n_1 - n_3}{n_3} < 0.1.$$

On the other hand, the high index difference waveguide is defined by the core 104 and cladding 106 as seen in FIG. 4, since $n_2$ is much larger than $n_3$:

$$0.3 \leq \frac{n_2 - n_3}{n_3}.$$

The fiber mode, whose cross-sectional dimension is similar to that shown in FIG. 3, is coupled to the left side of the mode transformer 100 as shown in FIGS. 1 and 2 when the mode transformer is used to couple fiber to a high index difference waveguide.

In operation, the mode traveling from left to right in the mode transformer 100 as shown in FIG. 1 will be transformed from that of the low index difference waveguide, whose core/cladding indices are $n_1/n_3$, to that of the high index difference waveguide, whose core/cladding indices are $n_2/n_3$.

The mode entering the mode transformer on the left side of FIG. 1 is determined by the waveguide cross-section shown in FIG. 3. The optical mode is guided by the low index difference waveguide, preserving the mode characteristics until the taper 108 in the high index core 104 is introduced, as shown in FIG. 1. In taper 108, the core 104 is horizontally tapered to gradually change the effective index from that of the waveguide mode in the low index waveguide. When the core 104 is narrow in taper 108, the effective index is close to that of the core 102 (and the cladding 106), thus the mode properties are similar. As the core 104 is gradually widened, the effective index increases accordingly, approaching that of the high index difference waveguide. The mode gradually transforms into a mode in the waveguide cross-section shown in FIG. 4 by the change of the effective index.

The core 102 is tapered in the opposite direction from the core 104, as seen in FIG. 1. This taper terminates the low index difference waveguide once the mode is coupled into high index difference waveguide. The taper also enhances the efficiency of mode transformation by optimizing the focusing and reflection of the mode.

The tapered regions 108 and 110 on high index difference and low index difference waveguides provide an efficient, bi-directional mode transformer, since the tapers on the high index difference waveguide terminates the high index difference waveguide once the mode is coupled into low index difference waveguide, and vice versa. The mode transformer 100 works for modes traveling from right to left as well as from left to right as shown in FIGS. 1 and 2, making it a bi-directional mode transformer.

The taper length of the high index core should be designed to minimize mode transformation loss. The design of the taper in the low index core should be designed to minimize reflection, maximize focusing, and maximize efficiency. The overlap portion 112 of the tapered regions 108, 110, should also be chosen to maximize coupling efficiency.

The mode transformer of the invention is useful for coupling mode from an optical fiber to a high index difference waveguide. The fiber mode can be coupled on left side of the transformer as shown in FIG. 1, whose cross-sectional view is shown in FIG. 3. The index difference between the core 102 and cladding 106 can be chosen to be similar to that of fiber (~0.01). The core/cladding indices and thus the mode are similar to that of fiber, resulting in a highly efficient coupling. Once coupled, the mode will be transformed into that of a high index difference waveguide as described above.

This coupling technology can be applied to any high index difference waveguide systems. For example, one can use $SiO_2$ as the cladding, SiON as the low index difference waveguide core, and $Si_3N_4$ as the high index difference waveguide core. For the illustrated exemplary embodiment, the design parameters of $L_1=L_2=50$ μm and $L_3=40$ μm gave a simulated values of 75% efficiency at the wavelength of 1.55 μm. This is an improvement over 30% efficiency for the case of butt-coupling without a dual-taper. The invention is a bi-directional transformer, which shows similar efficiencies for mode transformation in both directions.

While exemplary embodiments of the invention have been illustrated with continuous or linear (flat edged) tapers, it will be appreciated that segmented or non-linear tapers can also be utilized in accordance with the invention. For example, the taper can have a stepped taper edge, or a concave or convex shaped taper edge.

Figure 5A:
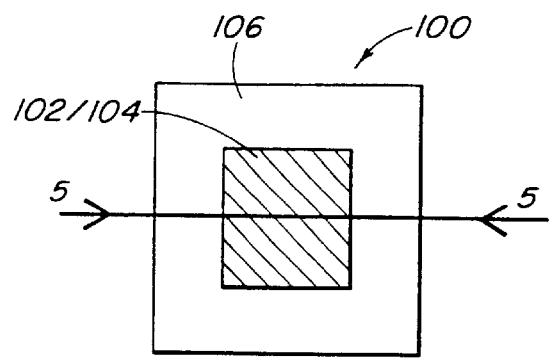
FIG. 5A is a cross-section view of the waveguide of FIGS. 3 and 4.
Figure 5B:
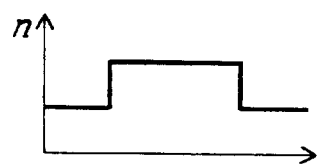
FIGS. 5B–5F are some possible index profiles along the arrowed line 5 in FIG. 5A.
Figure 5C:
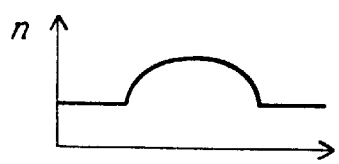
Figure 5D:
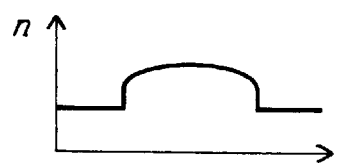
Figure 5E:
Figure 5F:
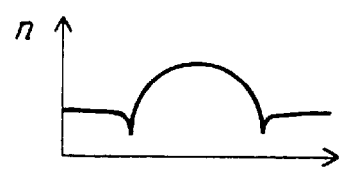

FIG. 5A is a cross-section view of the waveguide of FIGS. 3 and 4. FIGS. 5B–5F are some possible index profiles along the arrowed line 5—5 in FIG. 5A. While exemplary embodiments of the invention have been illustrated with step index profiles between the core and the cladding for both low and high index difference waveguides as shown in FIGS. 5A and 5B, it will be appreciated that other index profiles between the core and the cladding can also be utilized in accordance with the invention.

For example, various other index profiles such as graded index and step graded index profiles can be used as long as the refractive index of the core is higher than the refractive index of the cladding on the average. Such profiles are shown in FIGS. 5C–5F. The various index profiles in FIGS. 5B–5F are illustrated along the horizontal direction for purposes of illustration, but can also be applied in other directions.

Figure 6:
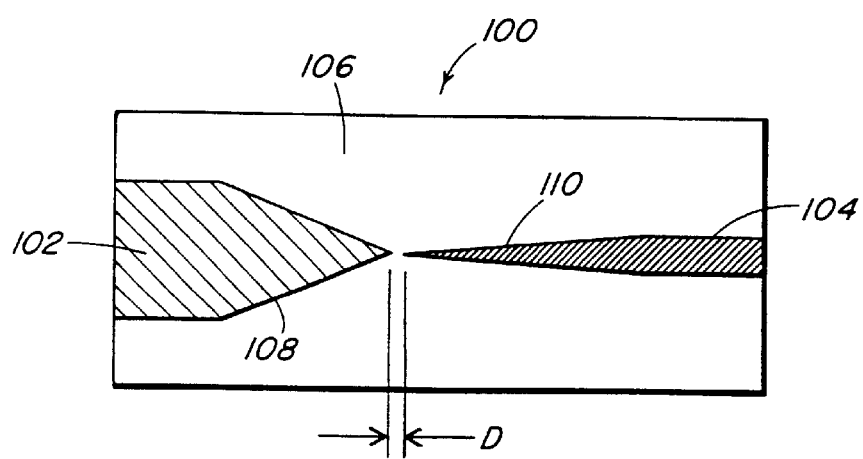
FIG. 6 is a top view of a mode transformer with two tapers whose tips are considered to be in contact, when D is short enough to allow for 0.1% or higher optical transmission.

While exemplary embodiments of the invention have been illustrated with the second taper embedded in the first taper, it will be appreciated that two tapers whose tips are in contact can also be utilized in accordance with the invention, with 0 overlapping taper sections. An example of two tapers whose tips are considered to be in contact is shown in FIG. 6. When the distance between the ends of the two tapers 108, 110, shown as D in FIG. 6, is short enough to allow for appreciable transmission efficiency, they should be considered to be in contact and have 0 overlapping sections, even though they are physically separated. Appreciable transmission efficiency is defined as the efficiency higher than or equal to 0.1%.

While exemplary embodiments of the invention have been illustrated with two channel waveguides, it will be appreciated that other waveguide configurations can be used as long as the mode-field sizes in cross-sectional area are similar to those in the channel waveguides used in this embodiment.

Although the present invention has been shown and described with respect to several preferred embodiments thereof, various changes, omissions and additions to the form and detail thereof, may be made therein, without departing from the spirit and scope of the invention.

What is claimed is:

1. A dielectric waveguide optical mode transformer comprising:
   a first dielectric channel waveguide including a first core having a first tapered region and surrounded by a cladding; and
   a second dielectric channel waveguide including a second core having a second tapered region and surrounded by said cladding, a portion of said second tapered region being embedded within said first tapered region with an embedded length ranging upwards from 0, wherein the embedded portion of said second tapered region is completely surrounded by said first tapered region in the cross-section transverse to the mode transformation direction, and wherein the embedded length of said second tapered region within said first tapered region is 0 when the tips of said first and second tapered regions are in contact.

2. The transformer of claim 1, wherein said cladding comprises one or more materials with different refractive indices than those of said first and second cores.

3. The transformer of claim 1, wherein the index of refraction of said first core is graded in the transverse direction.

4. The transformer of claim 1, wherein the index of refraction of said second core is graded in the transverse direction.

5. The transformer of claim 1, wherein the index of refraction of said cladding is graded in the transverse direction.

6. The transformer of claim 1, wherein the index of refraction changes gradually from said first core to said cladding in the transverse direction.

7. The transformer of claim 1, wherein the index of refraction changes gradually from said second core to said cladding in the transverse direction.

8. The transformer of claim 1, wherein the index of refraction changes abruptly from said first core to said cladding in the transverse direction.

9. The transformer of claim 1, wherein the index of refraction changes abruptly from said second core to said cladding in the transverse direction.

10. The transformer of claim 1, wherein the tips of said first and second tapered region are in contact if the optical transmission efficiency between said first and said second tapered regions is equal to or above 0.1%.

11. The transformer of claim 1, wherein said first and second cores, and said cladding are integrated on a planar lightwave circuit (PLC).

12. The transformer of claim 1, wherein the index of refraction of said first core is relatively lower than the index of refraction of said second core.

13. The transformer of claim 1, wherein the index of refraction of said first core is slightly higher than the index of refraction of said cladding.

14. The transformer of claim 13, wherein $0<(n_1-n_3)/n_3<0.1$, where $n_1$ is the refractive index of said first core and $n_3$ is the refractive index of said cladding.

15. The transformer of claim 1, wherein the index of refraction of said second core is substantially higher than the index of refraction of said first core and said cladding.

16. The transformer of claim 15, wherein $0.3 \leq (n_2-n_3)/n_3$, where $n_1$ is the refractive index of said first core, $n_2$ is the refractive index of said second core, and $n_3$ is the refractive index of said cladding.

17. The transformer of claim 1, wherein a propagating optical mode is transformed in size, shape and speed as it propagates between said first core and said second core.

18. The transformer of claim 1, wherein a propagating optical mode can propagate bi-directionally between said first and second waveguides.

19. The transformer of claim 1, wherein said second tapered region provides an effective index change to a propagating optical mode.

20. The transformer of claim 1, wherein said first tapered region minimizes reflection of a propagating mode and focuses said propagating mode into said second core.

21. The transformer of claim 1, wherein said first tapered region enhances the efficiency of mode transformation of a propagating mode.

22. The transformer of claim 1, wherein said first and second tapered regions are continuous or segmented.

23. The transformer of claim 1, wherein said first and second tapered regions are linear or non-linear.

24. A dielectric waveguide optical mode transformer comprising:
a first dielectric waveguide including a first core having a first tapered region and surrounded by a cladding; and
a second dielectric waveguide including a second core having a second tapered region and surrounded by said cladding, a portion of said second tapered region being embedded within said first tapered region with an embedded length ranging upwards from 0, wherein said second core and said cladding define a high index difference waveguide, and wherein the embedded portion of said second tapered region is completely surrounded by said first tapered region in the cross-section transverse to the mode transformation direction, and wherein the embedded length of said second tapered region within said first tapered region is 0 when the tips of said first and second tapered regions are in contact.

25. The transformer of claim 24, wherein the index of refraction of said first core is relatively lower than the index of refraction of said second core.

26. The transformer of claim 24, wherein a high index difference waveguide is defined as a waveguide whose mode-field size is within 50% difference in cross-sectional area from that of a channel waveguide whose index difference is equal to or larger than 0.3.

27. The transformer of claim 24, wherein a propagating optical mode is transformed in size, shape and speed as it propagates between said first core and said second core.

28. The transformer of claim 24, wherein a propagating optical mode can propagate bi-directionally between said first and second waveguides.

29. The transformer of claim 24, wherein said second tapered region provides an effective index change to a propagating optical mode.

30. The transformer of claim 24, wherein said first tapered region minimizes reflection of a propagating mode and focuses said propagating mode into said second core.

31. The transformer of claim 24, wherein said first tapered region enhances the efficiency of mode transformation of a propagating mode.

32. The transformer of claim 24, wherein said first and second tapered regions are continuous or segmented.

33. The transformer of claim 24, wherein said first and second tapered regions are linear or non-linear.

34. The transformer of claim 24, wherein the index of refraction of said first core is graded in the transverse direction.

35. The transformer of claim 24, wherein the index of refraction of said second core is graded in the transverse direction.

36. The transformer of claim 24, wherein the index of refraction of said cladding is graded in the transverse direction.

37. The transformer of claim 24, wherein the index of refraction changes gradually from said first core to said cladding in the transverse direction.

38. The transformer of claim 24, wherein the index of refraction changes gradually from said second core to said cladding in the transverse direction.

39. The transformer of claim 24, wherein the index of refraction changes abruptly from said first core to said cladding in the transverse direction.

40. The transformer of claim 24, wherein the index of refraction changes abruptly from said second core to said cladding in the transverse direction.

41. The transformer of claim 24, wherein the tips of said first and second tapered region are in contact if the optical transmission efficiency between said first and said second tapered regions is equal to or above 0.1%.

42. The transformer of claim 24, wherein said first core, said second core, and said cladding are integrated on planar lightwave circuit (PLC).

43. The transformer of claim 24, wherein said cladding is defined as a region or regions surrounding said first and second cores with lower effective index than those of said first and second cores.

44. The transformer of claim 24, wherein said cladding is defined as a region or regions surrounding said first and second cores where the evanescent field of optical modes exists.

* * * * *